United States Patent
Stevenson et al.

(10) Patent No.: US 7,874,109 B2
(45) Date of Patent: Jan. 25, 2011

(54) FIREPROOF PANELS AND METHODS OF FABRICATING THE SAME

(75) Inventors: James F. Stevenson, Morristown, NJ (US); Siu-ching D. Lui, Bridgewater, NJ (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 12/182,858

(22) Filed: Jul. 30, 2008

(65) Prior Publication Data

US 2010/0024336 A1   Feb. 4, 2010

(51) Int. Cl.
  *E04C 2/00* (2006.01)
(52) U.S. Cl. .................................................. 52/232
(58) Field of Classification Search .............. 52/232; 428/229

See application file for complete search history.

(56) References Cited

U.S. PATENT DOCUMENTS

| 4,299,872 A | 11/1981 | Miguel et al. |
| 4,767,656 A | 8/1988 | Chee et al. |
| 5,460,864 A | 10/1995 | Heitkamp |
| 5,558,932 A | 9/1996 | Scanlon |

*Primary Examiner*—Richard E Chilcot, Jr.
*Assistant Examiner*—Mark R Wendell
(74) *Attorney, Agent, or Firm*—Ingrassia Fisher & Lorenz, P.C.

(57) ABSTRACT

Methods and apparatus are provided for making a fireproof panel. The fireproof panel includes a first ply of material and a ceramic material impregnating at least a portion of the first ply of material, the ceramic material formulated to resist loss of physical properties when exposed to temperatures of at least 1090° C.

15 Claims, 3 Drawing Sheets

FIREPROOF PANELS AND METHODS OF FABRICATING THE SAME

TECHNICAL FIELD

The inventive subject matter generally relates to fireproof panels, and more particularly relates to single and multi-ply fireproof panels and methods of fabricating materials for the panels.

BACKGROUND

Many types of materials are used in the manufacturing of aircraft. Depending on the purpose for which the materials may be used, the materials may be subjected to certain standards set by the Federal Aviation Administration (FAA) and/or other governmental regulation agencies. For example, fire-resistant materials and structures may be implemented into aircraft to improve aircraft safety; however, before these materials or structures are used, they are investigated to determine whether they pass certain regulatory fire-resistance tests. One such test is delineated in Advisory Circular 20-135, which indicates that materials and structures used for fire-resistance purposes should be capable of withstanding a 2000° F. (1090° C.) flame for fifteen minutes. A structure which passes this test is designated as "fireproof".

Polymeric composite materials, such as bismaleimide (BMI), have been used in the past to form structures that meet the aforementioned FAA fireproof tests. However, although these materials provide adequate fire-resistant properties, they have certain drawbacks. In particular, BMI may be relatively expensive to obtain, and thus, inclusion thereof may increase aircraft manufacturing costs. Moreover, BMI materials may be export-controlled. As a result, the locations at which aircraft components including BMI materials can be manufactured may be limited and manufacturing costs may be high.

Accordingly, it is desirable to have improved materials and/or structures that at least pass tests regarding fireproof capability and that are not export-controlled. In addition, it is desirable to have materials and/or structures that are relatively simple to implement into existing aircraft component designs. Moreover, it is desirable to have processes to fabricate the materials and/or structures that are relatively inexpensive as well. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Fireproof panels and methods of fabricating fireproof panels are provided.

In an embodiment, by way of example only, a fireproof panel includes a first ply of material and a ceramic material impregnating at least a portion of the first ply of material, where the ceramic material is formulated to resist loss of mechanical properties when exposed to temperatures of at least 1090° C.

In another embodiment, by way of example only, a multi-ply fireproof panel includes a first outer ply of material, a second outer ply of material, and one or more inner plies of material. The first outer ply includes a ceramic material impregnated therein, where the ceramic material is formulated to resist loss of mechanical properties when exposed to temperatures of about 1090° C. The second outer ply of material includes the ceramic material impregnated therein. The one or more inner plies of material are impregnated with a matrix resin and disposed between the first outer ply of material and the second outer ply of material.

In yet another embodiment, by way of example only, a method of fabricating a fireproof panel includes impregnating at least a portion of a first ply of material with a ceramic material, the ceramic material comprising one or more compounds including a material selected from the group consisting of sodium silicate, sodium oxide, silica, alumina, silicon carbide, zirconium oxide, boron nitride, titanium nitride, magnesia, and yttria, and heat treating the impregnated first ply of material to form the fireproof panel.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
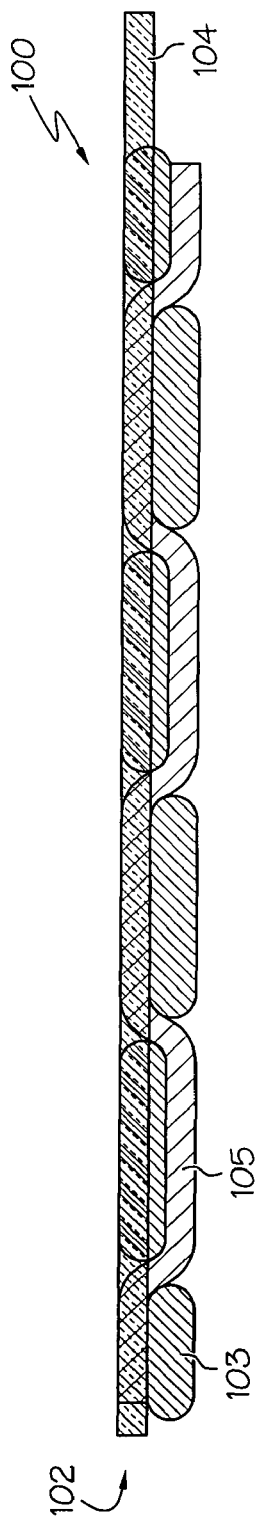
FIG. 1 is a simplified, cross-sectional, side view of a fireproof panel, according to an embodiment.

FIG. 1 is a cross-sectional side view of a fireproof panel 100, according to an embodiment. The fireproof panel 100 may be implemented into any one of numerous applications in which isolation from a fire of a space or a device may be desired. In accordance with one embodiment, the fireproof panel 100 may be incorporated into an aircraft, a wall of a building, or another enclosed area to isolate two fire zones from each other or to isolate a fire zone and a non-fire zone from each other. In another embodiment, the fireproof panel 100 may be used as a stand-alone device, such as a shield, to isolate a user, vehicle or another device from direct contact with a flame. According to an embodiment, the fireproof panel 100 is configured to withstand a burn test in which the panel 100 is placed adjacent to a flame having a temperature of about 2000° F. (1090° C.). In one embodiment, the fireproof panel 100 is adapted to withstand the 2000° F. (1090° C.) flame for 15 minutes without the flame burning through one side of the panel 100 to an opposite side thereof or igniting material on the opposite side. A panel which withstands such conditions is designated as "fireproof" in Department of Transportation Advisory Circular 20-135. In yet other embodiments, the fireproof panel 100 may be capable of withstanding the 2000° F. (1090° C.) flame for more than 15 minutes.

In one embodiment, the fireproof panel 100 may include a single ply of material 102 and a ceramic material 104. The single ply of material 102 may include a ply of fibers. In accordance with an embodiment, the ply of fibers may be a unidirectional flat array of fibers. According to another embodiment, the ply of fibers may be fibers which are braided or woven, such as in a plain weave or five harness weave, to form a fabric. FIG. 1 specifically illustrates a five harness weave in which a longitudinal fiber 105 is woven over and under a group of four transverse fibers 103 shown as a single entity. The ply of material 102 may have a thickness in a range of about 0.10 mm (e.g., for aligned fibers) to about 0.9 mm (e.g., for a braided or woven fabric). In an embodiment with a five harness weave, the thickness of the ply of material 102 is about 0.4 mm. In any case, the ply of material may include fibers or fabrics of a material selected from the group consisting of carbon fiber, silica-alumina fiber, ceramic fiber, and basalt fiber. Examples of suitable carbon fabrics include, but are not limited to fabrics woven from carbon fiber, such as Panex® material available through Zoltek Corporation of Missouri, T300 6K five harness weave fabrics available through Toray Industries Inc. of Japan, and the like. Suitable silica-alumina fiber materials include, but are not limited to Silcosoft® needled felt materials available through BGF Industries of Greensboro, N.C. Basalt fabrics that may be suitable for inclusion in the fireproof panel 100 include, but are not limited Basaltex® materials available through Groep Masureel of Belgium. In other embodiments, other types of fiber or fabric materials may alternatively be employed.

The ceramic material 104 is impregnated into at least a portion of the ply of material 102. In an embodiment, the ceramic material 104 is impregnated into at least a portion of an interior of the ply of material 102 proximate a surface, thereof, in an embodiment. In another embodiment, the ceramic material 104 impregnates substantially the entire ply of material 102 so that the ceramic material 104 is disposed on the surface, on an opposite surface, and in spaces between the fibers and/or fabric of the ply of material 102.

According to an embodiment, the ceramic material 104 is formulated to substantially resist decomposition when exposed to temperatures of about 1090° C. or higher. As used herein, the term "decomposition" may be defined as a loss of physical properties, where the physical properties may include loss of structural integrity, which may result from melting. To substantially resist decomposition, the ceramic material 104 may include one or more compounds that may be selected for certain physical properties, such as adhesion to carbon fibers, good mechanical properties at temperatures exceeding 1090° C., and solubility in water. In one embodiment, the ceramic material 104 may be formulated to include a compound that includes sodium silicates. Examples of suitable sodium silicate compounds include, but are not limited to, sodium orthosilicate (e.g., $Na_4SiO_4$ or $2Na_2O.SiO_2$), sodium metasilicate (e.g., $Na_2SiO_3$ or $Na_2O.SiO_2$), sodium disilicate (e.g., $Na_2Si_2O_5$ or $Na_2O.2SiO_2$), and sodium tetrasilicate (e.g., $Na_2Si_4O_9$ or $Na_2O.4SiO_2$). In another embodiment, the ceramic material may be formulated as a mixture of two or more sodium silicate compounds.

In still yet another embodiment, the ceramic material 104 may comprise a compound that includes alumina. According to another embodiment, the ceramic material 104 may comprise a compound that includes silicon carbide. In accordance with another embodiment, the ceramic material 104 may comprise a compound that includes zirconium oxide. According to yet another embodiment, the ceramic material 104 may comprise a compound that includes a nitride, including but not limited to boron nitride and titanium nitride. In still another embodiment, the ceramic material 104 may comprise a compound that may include magnesia or that may include yttria. In any case, by impregnating at least a portion of the ply of material 102 with the ceramic material 104, the material becomes stiffer and adjacent fibers bond to form a more rigid structure. As a result, the impregnated ply of material 102 may be more resistant to fires and/or may be more capable of containing fires having temperatures of at least 2000° F. (1090° C.) as compared to untreated fibers, untreated fabrics or untreated materials.

Figure 2:
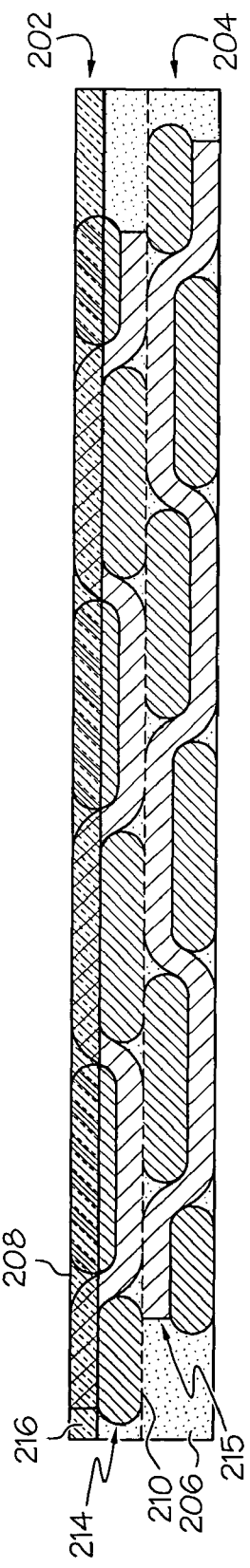
FIG. 2 is a simplified, cross-sectional side view of a fireproof panel, according to another embodiment.

In another embodiment, the ply of material may be incorporated into a multi-ply panel. FIG. 2 is a simplified, cross-sectional view of a fireproof panel 200, according to an embodiment, that includes multiple plies of material. The multi-ply fireproof panel 200 includes an outer ply of material 202, one or more inner plies of material 204, and a matrix resin 206. According to an embodiment, the outer ply 202 has an exposed surface 208 that is adapted to be exposed to a flame and has an unexposed surface 210 that may be bonded to an adjacent inner ply 204. To provide fire-resistance, the outer ply 202 is constructed substantially similarly to the ply of material 102 (FIG. 1) discussed above. For example, the outer ply 202 may include a ply of material 214 made up of fibers or fabric, and the ply of material 214 may be at least partially impregnated with a ceramic material 216. The ply of material 214 is selected from one of the above-mentioned fiber or fabrics. In one embodiment, as shown in FIG. 2, the ply of material 214 includes fibers woven over and under each other to form a fabric. The ceramic material 216 is selected from one of the above-mentioned ceramic materials. The ceramic material 216 may be disposed on at least a portion of the exposed surface 208 of the outer ply 202, in an embodiment. In another embodiment, the ceramic material 216 may impregnate an entirety of the outer ply 202 and is thus disposed at least partially on the exposed and unexposed surfaces 208, 210 of the outer ply 202. The outer ply 202 may have a thickness in a range of from about 0.1 mm to about 0.9 mm.

The inner ply 204 is adhered to the outer ply 202 and provides additional structural rigidity for the multi-ply fireproof panel 200. In an embodiment, the inner ply 204 may include a fiber or fabric material 215. In one embodiment, as shown in FIG. 2, fiber or fabric material 215 includes fibers woven over and under each other to form a fabric. The fiber or fabric material 214 may be selected from carbon fiber, silica-alumina fiber, ceramic fiber, and basalt fiber. Examples of suitable carbon fiber or fabric include, but are not limited to fabrics woven from carbon fiber such as Panex® materials available through Zoltek Corporation of Missouri, T300 6K five harness weave fabrics available through Toray Industries Inc. of Japan, and the like. Suitable silica-alumina fiber or fabrics include, but are not limited to Silcosoft® needled felt materials available through BGF Industries of Greensboro, N.C. Basalt fiber or fabrics that may be suitable for inclusion in the fireproof panel 200 include, but are not limited Basaltex® materials available through Groep Masureel of Belgium. In other embodiments, other types of fiber or fabric materials may alternatively be employed.

The fiber or fabric material 215 of the inner ply 204 may be the same fiber or fabric material as that used in the outer ply 202, in an embodiment. In another embodiment, the fiber or fabric material 215 of the inner ply 204 may be different from the ply of material 214 of the outer ply 202. For example, the fiber or fabric material 215 of the inner ply 204 may include a first type of carbon fiber or fabric, such as one provided by carbon fiber woven fabrics such as Panex® materials available through Zoltek Corporation of Missouri, while the outer ply fiber or fabric material 214 may include a second type of carbon fiber fabric, such as a T300 6K five harness weave fabric available through Toray Industries Inc. of Japan.

The matrix resin 206 impregnates and adheres the fiber or fabric 215 of the inner ply 204 to the fiber or fabric 214 of the outer ply 202 and thus, in an embodiment, may be present in the outer ply 202 as well as the inner ply 204. Examples of materials suitable for the matrix resin 206 include an epoxy matrix compound that includes a phenol novolac resin, a polyether elastomer as a toughening agent, and an ammonium phosphate salt as a flame retardant. A hardener may be mixed with the epoxy matrix compound to initiate a cure process. The hardener may be comprised of diaminodiphenylsulfone (DDS) and a hindered alkyl aromatic amine. An alternative matrix resin 206 can be compounded based on benzoxazine chemistry.

Figure 3:
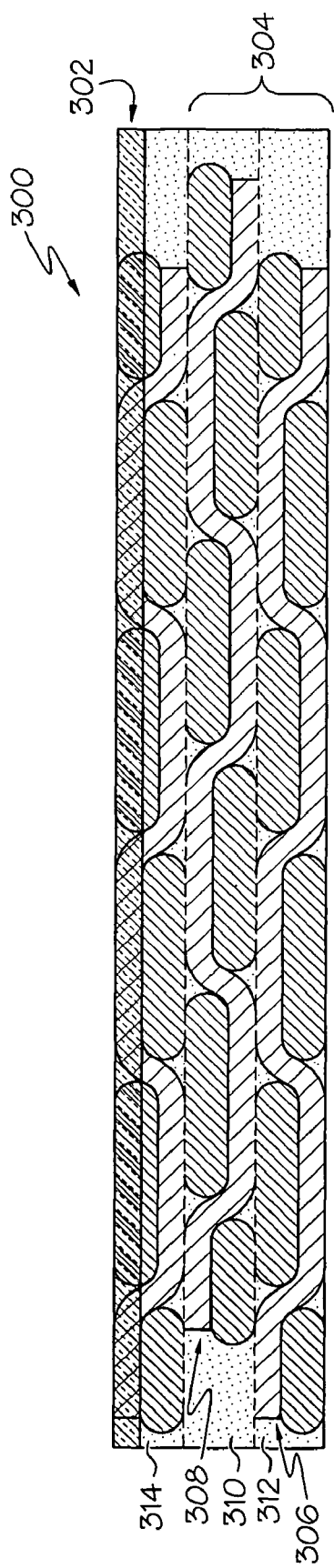
FIG. 3 is a simplified, cross-sectional side view of a fireproof panel, according to still another embodiment.

Although the inner ply 204 is shown as a single layer, it will be appreciated that the inner ply 204 may include more than one layer. FIG. 3 is a close-up, cross-sectional view of a fireproof panel 300 similar to fireproof panel 200 depicted in FIG. 2, except fireproof panel 300 includes a multiple inner plies 304, according to an embodiment. These inner plies 304 consist of two layers 306, 308 of fiber or fabric materials, in an embodiment, and in other embodiment may include more layers. In one embodiment, as shown in FIG. 3, the layers 306, 308 each include fibers woven over and under each other to form a fabric. The layers 306, 308 may be formed from a single type of fiber or fabric material, in an embodiment. However, in other embodiments, each layer may be different types of fiber or fabric materials. A matrix resin 310 and 314 formulated similar to matrix resin 206 of FIG. 2 may partially impregnate and adhere the fiber or fabric of a first outer ply 302 and an adjacent inner ply layer 308 of fiber or fabric. Inner ply layers 308 of fiber or fabric adhere to adjacent inner ply layers 306 of fiber or fabric by means of matrix resin 312 impregnated into fiber or fabric layer 306 and matrix resin 310 impregnated into fiber or fabric layer 308. Additional inner ply layers may be added in a manner similar to that described previously. It will be appreciated that matrix resin 310 312, and 314 may be indistinguishable from each other, in some embodiments, and each may be present in adjacent plies.

Figure 4:
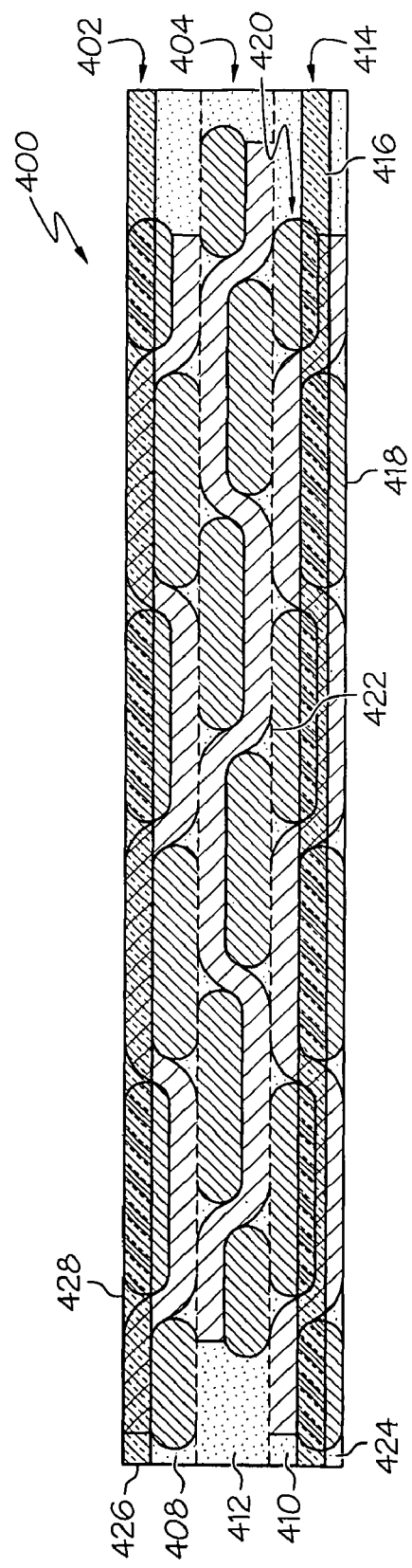
FIG. 4 is a simplified, cross-sectional side view of a fireproof panel, according to still another embodiment.

To provide the fireproof panel 300 with additional fire-resistant properties, a second outer ply may be included, in an embodiment. FIG. 4 is a close-up, cross-sectional view of a fireproof panel 400 similar to fireproof panel 200 depicted in FIG. 2 and to fireproof panel 300 depicted in FIG. 3, except fireproof panel 400 includes a second outer ply 414, according to an embodiment. In an example, a first outer ply 402 and the second outer ply 414 are disposed such that an inner ply 404 is located therebetween. Matrix resin 408, 410, and 412 impregnate and adhere the first outer ply 402 to a first side of the inner ply 404 and the second outer ply 414 to a second side of the inner ply 404. It will be appreciated that inner ply 404 may include a single layer, such as in panel 200, or inner ply 404 may be replicated into multiple layers, such as in panel 300.

In any case, the second outer ply 414 is configured similarly to outer ply 202 (FIG. 2) and to outer ply 302 (FIG. 3). In this regard, the second outer ply 414 includes at least a portion of ply of material 420, which may be fibers or a fabric, impregnated with a ceramic material 416 that is at least disposed on an adjacent exposed surface 418 thereof, where the ply of material 420 is selected from one of the above-mentioned fiber or fabrics. In one embodiment, as shown in FIG. 4, the ply of material 420 includes fibers woven over and under each other to form a fabric. The ceramic material 416 is selected from one of the above-mentioned ceramic materials. The ceramic material 416 impregnates at least a portion of an interior of the ply of material 420 adjacent the exposed surface 418 in an embodiment. In another embodiment, the ceramic material 416 may impregnate an entirety of the second outer ply 414 and may be disposed on at least a portion of the exposed and unexposed surfaces 418, 422 of the second outer ply 414. The second outer ply 414 may have a thickness in a range of between about 0.1 mm to about 0.9 mm. In other embodiments, the thickness of the second outer ply 414 may be thicker or thinner than the aforementioned range. In an embodiment, the second outer ply 414 may be configured substantially similarly to the first outer ply 402. In another embodiment, the second outer ply 414 may be made of different materials than the first outer ply 402. Alternatively, as shown in the first outer layer 402, the region impregnated with the ceramic material 416 can extend to an outer surface 428 of the outer layer 402. In another embodiment, additional matrix resin 426 may be applied to the outer surface 418 of the second outer ply 414.

Figure 5:
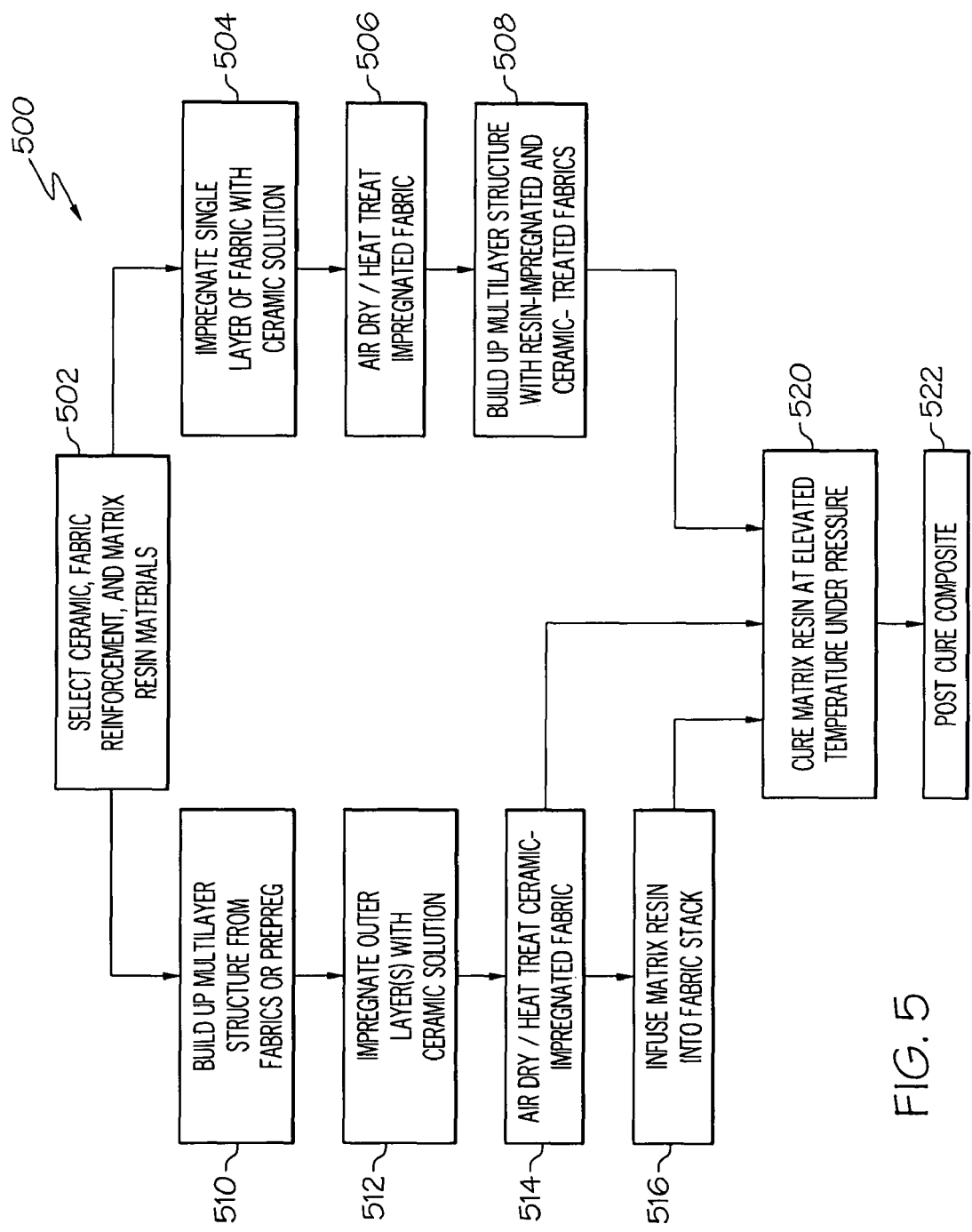
FIG. 5 is a flow diagram of a method of fabricating a fireproof panel, according to an embodiment.

FIG. 5 is a flow diagram of a method 400 for fabricating fire-resistant materials, according to an embodiment. The method 400 may be used to manufacture panels as well (e.g., panel 100 of FIG. 1, panel 200 of FIG. 2, panel 300 of FIG. 3, and panel 400 of FIG. 4). In accordance with one embodiment, ceramic materials, fiber or fabric materials, and matrix resin materials are selected, step 502. The ceramic materials, fiber or fabric materials, and matrix resin materials may include those mentioned above to describe panel 100 of FIG. 1, panel 200 of FIG. 2, panel 300 of FIG. 3, and panel 400 of FIG. 4. For example, the ceramic material may be formulated to include a compound that includes compounds formed from sodium oxide ($Na_2O$), silica ($SiO_2$) or from sodium silicate compounds. Examples of suitable sodium silicate compounds include, but are not limited to, sodium orthosilicate (e.g., $Na_4SiO_4$ or $2Na_2O.SiO_2$), sodium metasilicate (e.g., $Na_2SiO_3$ or $Na_2O.SiO_2$), sodium disilicate (e.g., $Na_2Si_2O_5$ or $Na_2O.2SiO_2$), and sodium tetrasilicate (e.g., $Na_2Si_4O_9$ or $Na_2O.4SiO_2$). In yet another embodiment, the ceramic materials may be formulated to include one or more sodium silicate compounds). In still yet another embodiment, the ceramic material may comprise a compound that includes alumina. According to another embodiment, the ceramic material may comprise a compound that includes silicon carbide. In accordance with another embodiment, the ceramic material may comprise a compound that includes zirconium oxide. According to yet another embodiment, the ceramic material may comprise a compound that includes a nitride, including but not limited to boron nitride and titanium nitride. In still another embodiment, the ceramic material may comprise a compound that may include magnesia or that may include yttria. In another example, the material comprises a fiber or fabric selected from the group consisting of a carbon fiber or fabric, a silica-alumina fiber or fabric, a ceramic fiber or fabric, and a basalt fiber or fabric.

According to an embodiment of method 500, a first ply of material is then impregnated with the ceramic material, step 504. In an embodiment, step 504 includes placing the ceramic material into solution. A particular formulation of the solution may depend on the particular ceramic material selected and on the viscosity of the solution. Appropriate diluents may be added to reduce the viscosity of the solution. In one example, in which the ceramic material includes a compound with one or more sodium silicates, the viscosity of the solution may be reduced by adding water.

In still yet another embodiment in which the ceramic material may comprise a compound that includes alumina, the ceramic material may further include an aluminum hydroxide oxide solution. According to another embodiment where the ceramic material may comprise a compound that includes silicon carbide, the solution may further include a phosphoric acid aqueous solvent. In accordance with another embodiment, the ceramic material may comprise a compound that includes zirconium oxide in a sodium metasilicate solution. According to yet another embodiment the ceramic material may comprise a compound that includes boron nitride, the boron nitride may be in an organic solvent, such as alcohol acetone. In another embodiment in which the ceramic material includes titanium nitride, the titanium nitride may be in an alcohol/acetone solvent. In still another embodiment, the ceramic material may comprise a compound that may include yttria which may be in an alcohol acetone solution.

In any case, the solution including the ceramic material may be painted onto the first ply of material, and allowed to soak into the first ply. For example, a brush may be dipped into the solution including the ceramic material therein to apply the ceramic material to impregnate at least a portion of the first ply of material therewith. Alternatively, the solution may be applied with a roller or may be sprayed on only one surface of the material or on both surfaces of the material. In another embodiment, the first ply of material is dipped into the solution including the ceramic material. The first ply of material is then removed from the solution, and excess solution is dripped off.

The first ply of material is then air dried and heat treated, step 506. In an embodiment, the first ply of material is air-dried so that at least a portion of the liquid from the ceramic material solution evaporates. Air-drying may occur for between about 2 hours and about 16 hours. In addition, or alternatively, the first ply of material may be heated to remove the liquid therefrom. According to an embodiment, step 506 may occur in an oven. The first ply of material may be unconstrained, or alternatively may be secured between two screens for drying to prevent deformation. In accordance with another embodiment, the first ply of material may be placed in a mold, and step 506 may occur therein. In accordance with an embodiment, the first ply of material is heated to a temperature in a range of between about 110° C. to about 130° C., for at least one hour to remove substantially all (e.g., at least 99%) of the water. If the first ply is exposed to ceramic solution only on one side, the matrix material may be applied to the opposite side of the first ply in the form of a paste, powder or film.

According to another embodiment, if the dried first ply of material is to be used to form a multi-ply fireproof panel, it may be used with additional resin-impregnated and ceramic-treated fabrics, step 508. In one embodiment, the first ply of material is adhered to a second ply of material. A matrix resin may be applied to one or both of the first and/or second plies of material. In an embodiment, the matrix resin may be an epoxy that is applied to a surface of the first ply that is not exposed to the ceramic material. According to another embodiment, one or both surfaces of the second ply of material may include the matrix resin thereon. The matrix resin may be applied by dusting a powder, painting, or pouring and distributed by a blade or squeegee. Alternatively, the second ply can be obtained in the form of a prepreg from a commercial vendor, where a matrix resin is pre-impregnated into the material that comprises the second ply. In any case, the surface of the first ply of material that has not been exposed to the ceramic material is contacted with the surface of the second ply material, and the two plies are pressed together by rollers or other means to remove air and insure uniform contact.

According to another embodiment, additional plies of fiber or fabric material may be adhered to the second ply of material as part of step 508. For example, a third, a fourth or more additional plies of fiber or fabric material, each being substantially identical to the second ply of fiber or fabric material, may be desired for inclusion in the fireproof panel. Then, the additional plies of fiber or fabric materials are stacked over each other, and/or the second ply of fiber or fabric material, and/or the first ply of fiber or fabric material. In another embodiment, a third ply of fiber or fabric material that is substantially similar in configuration to the first ply of fiber or fabric material (i.e., is impregnated with the ceramic material) may be desired for inclusion in the fireproof panel. Here, the epoxy material is deposited over a surface of the third ply that is intended to be unexposed and the first, second, and third plies are stacked such that the intended exposed surfaces of the first and third plies face outwardly and the second ply is disposed between the first and third plies. It will be appreciated that additional plies of fiber or fabric material may be placed between the first and third plies.

In any case, the stacked plies of fiber or fabric material are then cured under pressure to form the fireproof panel, step 520. In an embodiment, a mold in which the plies are disposed is closed and heated to a temperature in a range of between about 120° C. to about 130° C. In another embodiment, the cured stacked plies of fiber or fabric material may be subjected to post-cure steps, step 522. For example, the cured stacked plies may be exposed to a post cure heat treatment cycle while exposed to the air outside the mold. In an embodiment, the heat treatment cycle may include a first heat step, where the cured stacked plies are heated to a first temperature for a first time period, followed by heat treatment at a second temperature for a second time period, followed by heat treatment at a third temperature for a third time period. In one example, the first temperature may be between about 120° C. and about 130° C. and the first time period may be about 30 minutes, the second temperature may be between about 140° C. and about 160° C. and the second time period may be about 30 minutes, and the third temperature may be between about 170° C. and about 190° C. and the third time period may be about two hours.

In another embodiment of method 500, after step 502 is performed, a multilayer structure of dry fabrics or fibers may be built up, step 510. In particular, two or more plies of material may be stacked in a desired configuration. For example, two outer plies may be included. In another example, one or more inner plies may be disposed between two outer plies.

Next, a ceramic material may be impregnated into the outer plies of material, step 512. The ceramic material may be applied to the outer plies in any manner similar to those described in step 504. As a result, a ceramic-impregnated fabric is formed. The ceramic-impregnated fabric is then dried and heat treated, step 514. In an embodiment, the ceramic-impregnated fabric is then placed in an air tight mold or a vacuum bag is secured thereover. In an embodiment in which a matrix resin has been pre-impregnated into the plies of material, the method 500 may proceed to steps 520 and 522 after 514.

In another embodiment in which the plies of material have not been pre-impregnated with a matrix resin, the matrix resin is infused into the ceramic-impregnated fabric, step 516. For example, the matrix resin may be infused into the fabric by pressure and/or vacuum. In one embodiment, a resin infusion process, such as resin transfer molding may be performed to infuse the matrix resin into the fabric. In some embodiments, after step 516 is performed, the method 500 may proceed to steps 520 and 522.

Although the foregoing description describes a structure in which the ceramic-impregnated plies of material are on one or both of the outer surfaces of a panel, they may alternatively be disposed in the interior of a panel, in other embodiments. In yet other embodiments, distribution of the ceramic-impregnated plies of material and the plies of materials that have not been treated with the ceramic material may be stacked such that the matrix resin-impregnated plies of material appear in any other sequence other than those described above.

The following example demonstrates various embodiments of the fireproof panels and materials and the methods of fabricating the panels and materials. These examples should not be construed as in any way limiting the scope of the inventive subject matter.

EXAMPLE

Four approximately 25-inch×25-inch (63.5 cm×63.5 cm) plies of fabric made of T300 PAN-based carbon as a five harness weave from Toray Industries America, Inc. of New York, N.Y. were cut with edges taped to prevent loose fibers from peeling off. Two of these fabrics were wetted in a ceramic material made up of a sodium metasilicate solution and dried overnight by hanging in a hood. The fabrics were then dried unconstrained in a hot air oven at 120° C. for an hour. Next, the dried fabrics were secured in a mold and hot air dried for a second hour to form two ceramic-treated plies of fabrics.

The remaining two untreated fabrics were impregnated with an epoxy compound. Specifically, a mold was constructed that included two aluminum plates measuring 28-inches×28 inches (71.1 cm×71.1 cm). One of the plates had a thickness of 0.5 inch (1.27 cm), and the other plate had a thickness of 0.75 inch (1.9 cm). The plates were held together by screws along their periphery and reinforced to prevent bulging by a crossbar clamped to the thinner plate.

The mold plates were preheated to 60° C. and about 42 g of an epoxy material was applied to the exterior surface of first ply of fabric. The epoxy material included a first mixture and a second mixture at a ratio of 4:1, where the first mixture included phenol novolac at about 75% by weight, polyether elastomer at about 8.6% by weight, and ammonium phosphate salt at about 16% by weight and the second mixture, known as a hardener, included diaminodiphenylsulfone (DDS) at about 60% by weight and hindered alkyl aromatic amine at about 40% by weight. The epoxy material was chilled and ground to fine epoxy powder, and approximately 42 grams was sprinkled on a layer of release film of Kapton® (available through E. I. du Pont de Nemours and Company of Delaware) that was placed on the mold plates and spread with a squeegee. One of the plies treated with the ceramic solution was positioned on the coated layer of release film. Next, approximately 45 grams of epoxy powder was spread over the top surface of the treated ply and spread with a squeegee. A hot air gun was used to maintain the epoxy material above its softening point. A second ply consisting of untreated fabric was placed on the epoxy-treated ply. Rollers were used to establish continuous contact between the two plies and to remove air. Approximately 68 grams of epoxy powder was placed on the exposed surface of the second ply and the spreading process described above was used.

This procedure was repeated for an additional ply of fabric and for an additional outer ply, which was treated with the solution of ceramic material. A final amount of epoxy powder (approximately 45 g) was applied to the exposed surface of the remaining ceramic-treated ply. The mold was closed by tightening screws against gauge blocks with a 0.052-inch (0.13 cm) spacing to insure a uniform thickness along the edges of the stacked plies. The mold was placed in a hot air oven and heated to 125° C. for three (3) hours to form a panel.

Next, the mold was opened and aluminum screens were placed on the top and bottom surfaces of the panel. The mold was lightly secured with screws, and the panel was exposed to a post cure cycle that included heat treatment for thirty (30) minutes at 125° C., thirty (30) minutes at 150° C., and two (2) hours at 180° C.

The resulting approximately 25-inch by 25-inch (63.5 cm×63.5 cm) panel had a layer-by-layer composition listed in Table 1:

TABLE 1

| LAYER | Fabric (wt. %) | Sodium Silicate (wt. %) | Epoxy (wt. %) | Total Weight |
|---|---|---|---|---|
| 1 | 39 | 43 | 18 | 368 |
| 2 | 72 | 0 | 28 | 201 |
| 3 | 68 | 0 | 32 | 212 |
| 4 | 38 | 41 | 21 | 382 |

Additionally, the resulting panel had a density of between about 1.45 g/cc and about 1.50 g/cc, a top surface that was completely wetted out, and a bottom surface with some dry epoxy spots without the bottom surface was positioned away from the flame in the burn test.

Before testing, a propane burner was set up and calibrated such that the average burner temperature was 2039° F. (1115.1° C.), an average burner heat flux density was 8.90 [BTU/(ft$^2$–sec)], a ¼" test thermocouple temperature was at 2025° F. (1107° C.). After testing, the average burner temperature was 2040° F. (1115.5° C.). It was found that the resulting panel completed a fifteen minute fire test with no signs of burn through and no opposite side ignition. Thus, the panel passed the fireproof test established by the Department of Transportation Advisory Circular 20-135.

Improved materials and/or structures have now been provided that meet fire-proof requirements. The improved fireproof panels and materials are relatively inexpensive to either obtain or manufacture and are not export-controlled. Moreover, methods of fabricating the panels and materials are relatively simple to perform and may be incorporated into the existing manufacturing processes.

While at least one exemplary embodiment has been presented in the foregoing detailed description of the inventive subject matter, it should be appreciated that a large number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A fireproof panel, comprising:
   a first ply of material including a first fiber material, the first ply of material having an exposed surface and an unexposed surface;
   a second ply of material including a second fiber material, the second ply of material having an exposed surface and an unexposed surface;
   a plurality of inner plies of material including a third fiber material impregnated with a matrix resin, the plurality of inner plies disposed between the first and second plies of material, the matrix resin adhering the plurality of inner plies of material to the unexposed surface of the first ply and the unexposed surface of the second ply; and a ceramic material impregnating at least a portion of the exposed surface of the first ply of material and at least a portion of the exposed surface of the second ply of material, the ceramic material formulated to resist loss of mechanical properties when exposed to temperatures of at least 1090° C.

2. The fireproof panel of claim 1, wherein the ceramic material comprises one or more compounds including a material selected from the group consisting of sodium silicate, sodium oxide, silica, alumina, silicon carbide, zirconium oxide, boron nitride, titanium nitride, magnesia, and yttria.

3. The fireproof panel of claim 2, wherein the sodium silicate comprises a compound selected from the group consisting of sodium orthosilicate, sodium metasilicate, sodium disilicate, sodium tetrasilicate, and combinations thereof.

4. The fireproof panel of claim 2, wherein the sodium silicate comprises a mixture of compounds including sodium oxide and silica.

5. The fireproof panel of claim 1 wherein the matrix resin comprises an epoxy.

6. The fireproof panel of claim 5, wherein the epoxy comprises a material selected from the group consisting of a reactant having two or more epoxide groups, a toughening agent, a flame retardant, and a curing agent having one or more amine groups.

7. The fireproof panel of claim 1, wherein the matrix resin comprises a benzoxazine compound.

8. The fireproof panel of claim 1, wherein the first ply of material includes a material selected from the group consisting of carbon fiber, silica-alumina fiber, ceramic fiber, and basalt fiber.

9. A multi-ply fireproof panel comprising:
a first outer ply of material including a ceramic material impregnated therein, the ceramic material formulated to resist loss of mechanical properties when exposed to temperatures of about 1090° C.;
a second outer ply of material including the ceramic material impregnated therein; and
one or more inner plies of material impregnated with a matrix resin and disposed between the first outer ply of material and the second outer ply of material, the matrix resin adhering to the first outer ply of material and the second outer ply of material.

10. The multi-ply fireproof panel of claim 9, wherein at least one of the first outer ply of material, the second outer ply of material, and the inner plies of material includes a material selected from the group consisting of a carbon fiber, a silica-alumina fiber, a ceramic fiber, and a basalt fiber.

11. The multi-ply fireproof panel of claim 9, wherein the ceramic material comprises one or more compounds including a material selected from the group consisting of sodium silicate, sodium oxide, silica, alumina, silicon carbide, zirconium oxide, boron nitride, titanium nitride, magnesia, and yttria.

12. The multi-ply fireproof panel of claim 9 wherein the matrix resin comprises an epoxy compound.

13. The multi-ply fireproof panel of claim 12, wherein the epoxy compound comprises a material selected from the group consisting of a reactant including two or more epoxide groups, a toughening agent, and a flame retardant, and a curing agent including one or more amine groups.

14. A method of fabricating a fireproof panel, the method comprising the steps of:
impregnating at least a portion of a to-be-exposed surface of a first ply of material and at least a portion of a to-be-exposed surface of a second ply of material with a ceramic material, the ceramic material comprising one or more compounds including a material selected from the group consisting of sodium silicate, sodium oxide, silica, alumina, silicon carbide, zirconium oxide, boron nitride, titanium nitride, magnesia, and yttria;
applying a matrix resin to additional plies of material;
stacking the additional plies of material over the first ply of material and placing the second ply of material over the additional plies of material to form stacked plies of material; and
heat treating the stacked plies of material such that the matrix resin adheres to an unexposed surface of the first ply of material and to an unexposed surface of the second ply of material to form the fireproof panel.

15. The method of claim 14, wherein the step of applying a matrix resin comprises:
injecting the matrix resin into the stacked plies by a resin infusion process.

* * * * *